United States Patent
Kirsteins et al.

(10) Patent No.: US 6,249,762 B1
(45) Date of Patent: Jun. 19, 2001

(54) METHOD FOR SEPARATION OF DATA INTO NARROWBAND AND BROADBAND TIME SERIES COMPONENTS

(75) Inventors: Ivars P. Kirsteins, Cranston; Sanjay K. Mehta, Bristol, both of RI (US); John W. Fay, Groton, CT (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 09/287,169

(22) Filed: Apr. 1, 1999

(51) Int. Cl.[7] .............................. G01L 11/02; G01L 21/02
(52) U.S. Cl. ..................... 704/233; 704/219; 704/220; 379/386
(58) Field of Search ................... 704/211, 219, 704/220, 233; 379/386

(56) References Cited

U.S. PATENT DOCUMENTS 5,442,696 * 8/1995 Lindberg et al. ................. 379/386

OTHER PUBLICATIONS

Kurt S. Riedel, "Minimum Bias Multiple Taper Spectral Estimation," IEEE Trans. Signal Processing, vol. 43, No. 1, pp. 188–195, Jan. 1995.*

Ivars P. Kirsteins, Sanjay K. Mehta, and John Fay, "Power–Law Processors for Detecting Unknown Signals in Colored Noise," IEEE ICASSP 97, vol. 1, pp. 483–486, Apr. 1997.*

Ivars P. Kirsteins, Sanjay K. Mehta, and John Fay, "Adaptive Separation of Unknown Narrowband and Broadband Time Series," IEEE ICASSP 98, vol. 4, pp. 2525–2528, May 1998.*

* cited by examiner

*Primary Examiner*—Tālivaldis I. Šmits
(74) *Attorney, Agent, or Firm*—Michael J. McGowan; Prithvi C. Lall; Michael F. Oglo

(57) ABSTRACT

A method for separation of acoustical data into narrowband and broadband time series components includes the steps of: constructing a data matrix in which time series samples of acoustical data are arranged in a forward-backward linear predictor matrix; decomposing a subband of the matrix into an in-band component and an out-of-band component; estimating narrowband components; estimating out-of-band leakage; removing the in-band narrowband component and the out-of-band narrowband component; repeating sequentially the afore mentioned five steps until narrowband components from all of the subbands of the matrix are removed from the acoustical data; and reconstructing the broadband time series; whereby to provide a narrowband time series estimate indicative of the presence of a signal in the acoustical data.

8 Claims, 5 Drawing Sheets

METHOD FOR SEPARATION OF DATA INTO NARROWBAND AND BROADBAND TIME SERIES COMPONENTS

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

(1) Field of the Invention

The present invention relates to a method for detecting signals in noise. More specifically, the present invention relates to the separation of known or unknown time series data into its narrowband and broadband components.

(2) Description of the Prior Art

Many applications require the identification of a desired signal within undesired random signals (noise) which is received with, and often interferes with, the desired signal. For example, in sonar systems randomly generated sounds from both natural and man-made sources give rise to a noise that interferes with desired acoustic signals. The detection and identification of a specific target, such as an underwater vehicle, requires a system which can detect a signal corresponding to the target within received data containing both the signal and noise.

Underwater acoustic signals are often complicated, consisting of a superposition:

$$x(t) = \sum_{k=1}^{P} n_k(t) + b(t) \quad t_o \leq t \leq t_o + T \quad (1)$$

of non-stationary narrowband (hereinafter designated as NB) $n_k(t)$ and broadband (hereinafter designated as BB) $b(t)$ components. Such signals arise from a variety of sources, such as ship machinery, marine mammals, drilling platforms, and active sonars. FIG. 1 illustrates what a typical underwater acoustic spectrum might look like, consisting of a superposition of narrowband line-like components plus a broadband component. The BB component itself can be colored, with many local spectral peaks and valleys.

There is a need for the separation of the signal x(t) into the constituent NB:$n_k(t)=S^P_{k=1}n_k(t)$ and BB:b(t) time series components when little or nothing is known about the NB and BB components and only a short data record is available. This is of great importance in sonar, especially passive sonar, where the desirable signal (for detection, classification, and localization) is often either the NB or BB component and the other is regarded as interference.

Existing approaches primarily deal with power spectrum estimation of the composite data, rather than recovering the constituent narrowband and broadband time series. Having the separated narrowband and broadband time series available is very useful since it allows many additional forms of processing (processing which is impossible or difficult to do using only the power spectrum), such as extraction of time series statistics, improved wavelet and Wigner analysis, pattern recognition, and parametric modeling.

The separation of the time series data into the NB and BB time series components is difficult. Wiener filtering (see S. Haykin, "Adaptive Filter Theory, Third Edition", Prentice Hall, 1996) is not practical since the covariance or spectral densities of the NB and BB components are not known. Parametric methods, e.g., MA (Moving Average), AR (Auto Regressive), ARMA (Auto Regressive Moving Average) modeling (see P. Stoica et al., "Introduction to Spectral Analysis", Prentice Hall, 1997), require choosing a model type for the underlying broadband component and for each of the NB components present. This is difficult since nothing is known about the NB and BB components. Adaptive methods applied directly to the time series, such as adaptive notch filters and line enhancers (see S. Haykin, supra) and Principal Component Inverse (PCI) method (see D. Tufts et al., "Data Adaptive Estimation by Singular-Value Decomposition of a Data Matrix" Proc. IEEE, Vol. 7, pp. 684–685, 1982; I. P. Kirsteins et al., "Adaptive Detection Using Low Rank Approximation to a Data Matrix" IEEE, Trans. Aerospace and Elect. Sys., Vol. 30, No. 1, pp. 55–57, 1994), tend to perform poorly when the broadband spectrum has a large dynamic range. That is, if a weak NB component is present in a "valley" of the BB spectrum, the notch filter tracker or PCI method might lock onto a nearby peak of the BB spectrum and filter it as the NB component, rather than the true NB component.

SUMMARY OF THE INVENTION

Accordingly, an object of the subject invention is to provide a new method, based on Thomson's multiple taper spectral estimation (hereinafter designated as MTSE) technique (see D. J. Thompson "Spectral Estimation and Harmonic Analysis", Proc. of IEEE, Vol. 70, No. 9, pp. 1055–1096, 1992; "An Overview of Multi-Window and Quadratic-Inverse Spectrum Estimation Method" (ICASSP-94, Vol. VI, pp. 185–194, 1994; P. Stoica, supra), and PCI method (see D. Tufts, supra; I. P. Kirsteins, supra), which alleviates the problems of false tracking inherent in adaptive notch filters and adaptation to the background BB and NB components.

Thomson proposed Multiple Taper Spectral Estimation (MTSE) (see D. J. Thompson, infra; P. Stoica, supra) for spectral analysis of complicated non-stationary data consisting of lines plus a background component with continuous spectrum in which the physical processes generating the data were poorly understood. A multiple taper spectral estimate, as shown in FIG. 2, is given by:

$$|\overline{X}(f_k)|^2 = \frac{1}{K}\|U^H D(f_k)x\|^2 F \quad (2)$$

where U is a N×K matrix whose K columns are the principal Discrete Prolate Spherioidal Sequence's (DPSS's) $u^k_n(N, W)$, which are the eigenvectors of the N×N matrix, $$[R]m, n = \frac{\sin 2\pi W(n-m)}{\pi(n-m)}, \quad (3)$$

arranged to correspond to the eigenvalues in descending order, $D(f) = \text{diag}(1, e^{-i2\pi f}, \ldots, e^{-i(N-1)2\pi f})$, W is the analysis bandwidth parameter, and K~2NW.

The matrix U in equation 2 acts as a lowpass filter with bandwidth W. Thus, the projection of the data vector x onto $V_k = D(f_k)U^H$ becomes a bandpass filtering of the data to $[f_k-W, f_k+W]$. X (f) is approximately the average energy in the band $[f_k-W, f_k+W]$. For a given set of frequency points, $f_1, \ldots, f_M$, the spectrum estimate of equation 2 is analogous to filtering x into the subbands $\{[f_0-W, f_0+W], [f_1-W, f_1+W], \ldots, [f_M-W, f_M+W]\}$, as shown in FIG. 2, and then calculating the average energy in each band.

The multiple taper method provides a simple and effective way of locating and removing tonals from the underlying continuous BB spectrum component. To avoid mistaking local BB spectral peaks as NB components and for avoiding interference from adjacent tonals, Thomson proposed that the estimation and removal of tonals be done separately within each subband, as depicted in FIG. 2. The main idea is that the projection of x onto $V_k$ effectively isolates the frequency band $[f_k-W, f_k+W]$ from out of band tonals, and if W is properly chosen, the background noise spectrum is approximately locally flat or white. Thus, effects from out of band tonals and problems of locking onto local spectral peaks of the broadband component are minimized.

An object of the invention is to use the methodology of MTSE to recover the NB:$n(t)=\Sigma^{p}_{k=1} n_k(t)$ and BB:$b(t)$ time series components. In concatenation of the matrix filter banks $V_k$ into matrix $[V_1|V_2| \ldots |V_h]$, the total filter bank output can be written as $z=V^H_x$. If rank $[V]=N$ (where N is the number of time series samples in x), then x can be reconstructed from z using $x=(V^H)\#z$, where operator # means pseudo-inverse. This suggests that an estimate of the broadband time series might be $x_{BB}=(V^H)\#z_{clean}$ where $$Z_{clean}^T = [\text{clean}(V_1^H x)^T | \text{clean}(V_2^H x)^T \ldots | \text{clean}(V_m^H x)^T] \quad (4)$$

and the operator "clean" depicts the tonal removal procedure depicted in FIG. 2, applied to the subbands where tonals are present.

Two problems with the above procedure are: (1) the NB components may not necessarily be pure tones (they could be from processes with bandwidth), and (2) leakage of NB components into adjacent subbands is not dealt with, since it is not possible to construct ideal passband filters.

A further object of the invention is to alleviate these two concerns by estimating and removing the NB components using the PCI method and then developing a simple method to estimate and remove leakage components.

A still further object of the invention is to provide a new procedure for removing the BB time series from the NB components.

With the above and other objects in view, as will hereinafter appear, a feature of the present invention is the provision of a method for separation of acoustical data into narrowband and broadband time series components, the method comprising the steps of:

(1) constructing a data matrix in which time series samples of acoustical data are arranged in a forward-backward linear predictor matrix;

(2) decomposing a subband of the matrix into an in-band component and an out-of-band component;

(3) estimating narrowband components;

(4) estimating out-of-band leakage;

(5) removing the in-band narrowband component and the out-of-band narrowband component;

(6) repeating steps (2)–(5) until narrowband components from all of the subbands of the matrix are removed from the acoustical data; and (7) reconstructing the broadband time series;

whereby to provide separately a narrowband or broadband time series estimate indicative of the presence of a signal in the acoustical data.

In accordance with a further feature of the invention, there is provided a method for detecting a target in an ocean environment, the method comprising the steps of:

(1) providing acoustical data by operation of a sonar system, the acoustical data including narrowband components indicative of presence of the target and broadband components resulting from randomly generated sounds;

(2) constructing a data matrix in which time series samples of acoustical data are arranged in a forward-backward linear predictor matrix;

(3) decomposing a subband of the matrix into an in-band component and an out-of-band component;

(4) estimating narrowband components;

(5) estimating out-of-band leakage;

(6) removing the in-band narrowband component and the out-of-band narrowband component;

(7) repeating steps (3)–(6) until narrowband components from all of the subbands of the matrix are removed from the acoustical data; and (8) reconstructing the broadband time series;

whereby to provide a narrowband time series estimate indicative of the presence of the target in the ocean environment.

The above and other features of the invention, including various novel details and combinations of steps, will now be more particularly described with reference to the accompanying drawings and pointed out in the claims. It will be understood that the particular method embodying the invention is shown by way of illustration only and not as a limitation of the invention. The principles and features of this invention may be employed in various and numerous embodiments without departing from the scope of the invention.

BRIEF DESCRIPTION OF THE DRAWINGS

A more complete understanding of the invention and many of the attendant advantages thereto will be readily appreciated as the same becomes better understood by reference to the following detailed description when considered in conjunction with the accompanying drawings wherein like reference numerals and symbols designate identical or corresponding parts throughout the several views and wherein.

DESCRIPTION OF THE PREFERRED EMBODIMENT

In order to exploit the low rank structure of the NB components in the signal and noise data, the time series samples are arranged into a forward-backward linear predictor matrix, the data matrix so constructed appearing as:

$$X = \begin{bmatrix} x_1 & \cdots & x_{N-L+1} & \overline{x}_L & \cdots & \overline{x}_N \\ x_2 & \cdots & x_{N-L+2} & \overline{x}_{L-1} & \cdots & \overline{x}_{N-1} \\ \vdots & \cdots & \vdots & \vdots & \vdots & \vdots \\ x_L & \cdots & x_N & \overline{x}_1 & \cdots & \overline{x}_{N-L+1} \end{bmatrix} \quad (5)$$

Figure 1:
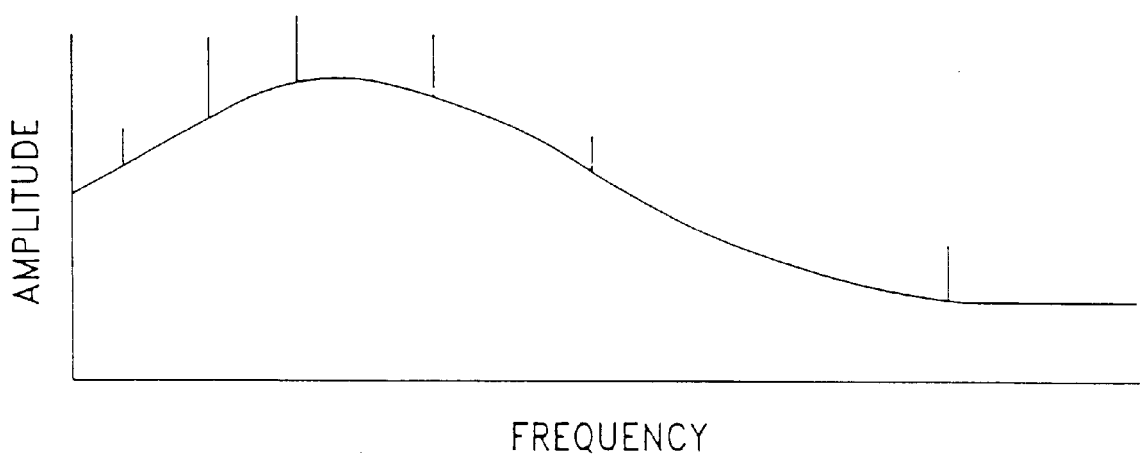
FIG. 1 is a graph which depicts a typical underwater signal spectrum.
Figure 2:
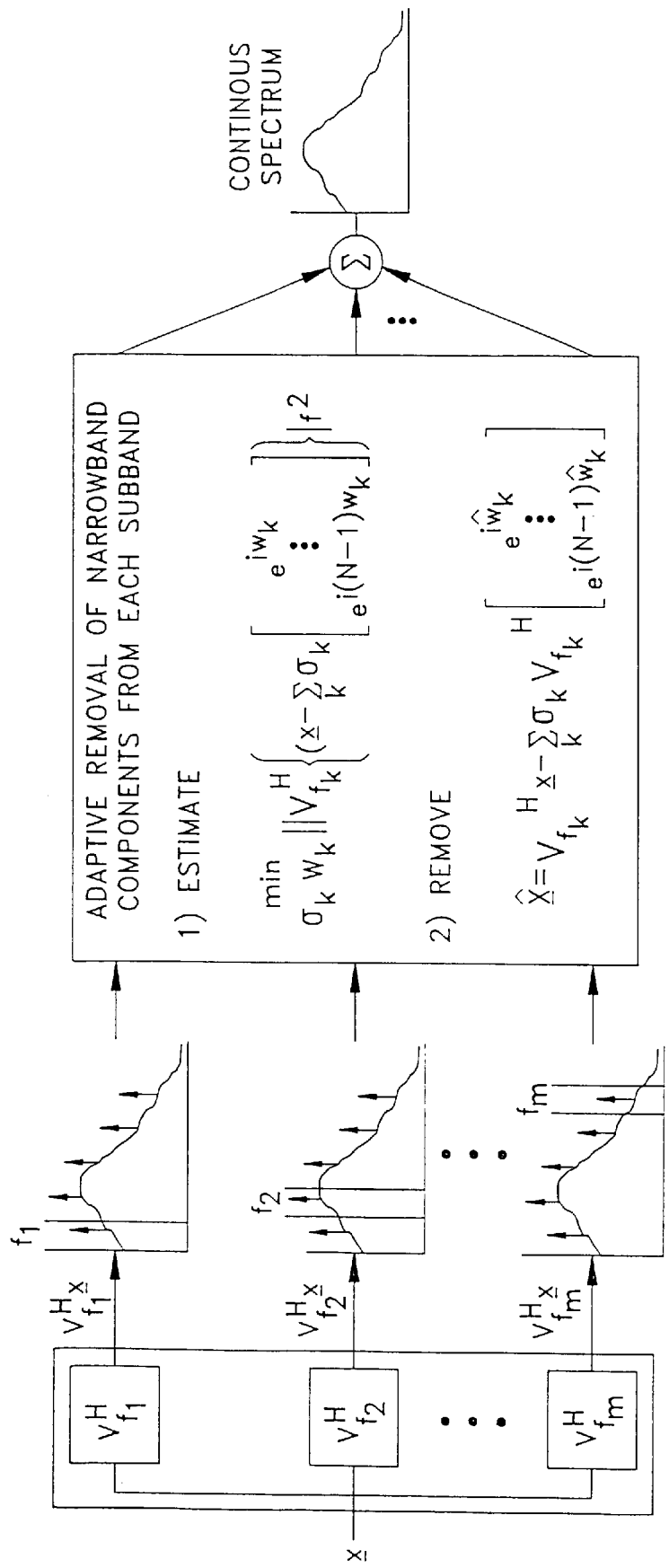
FIG. 2 is a graph which depicts a multiple taper method and tonal removal.
Figure 3:
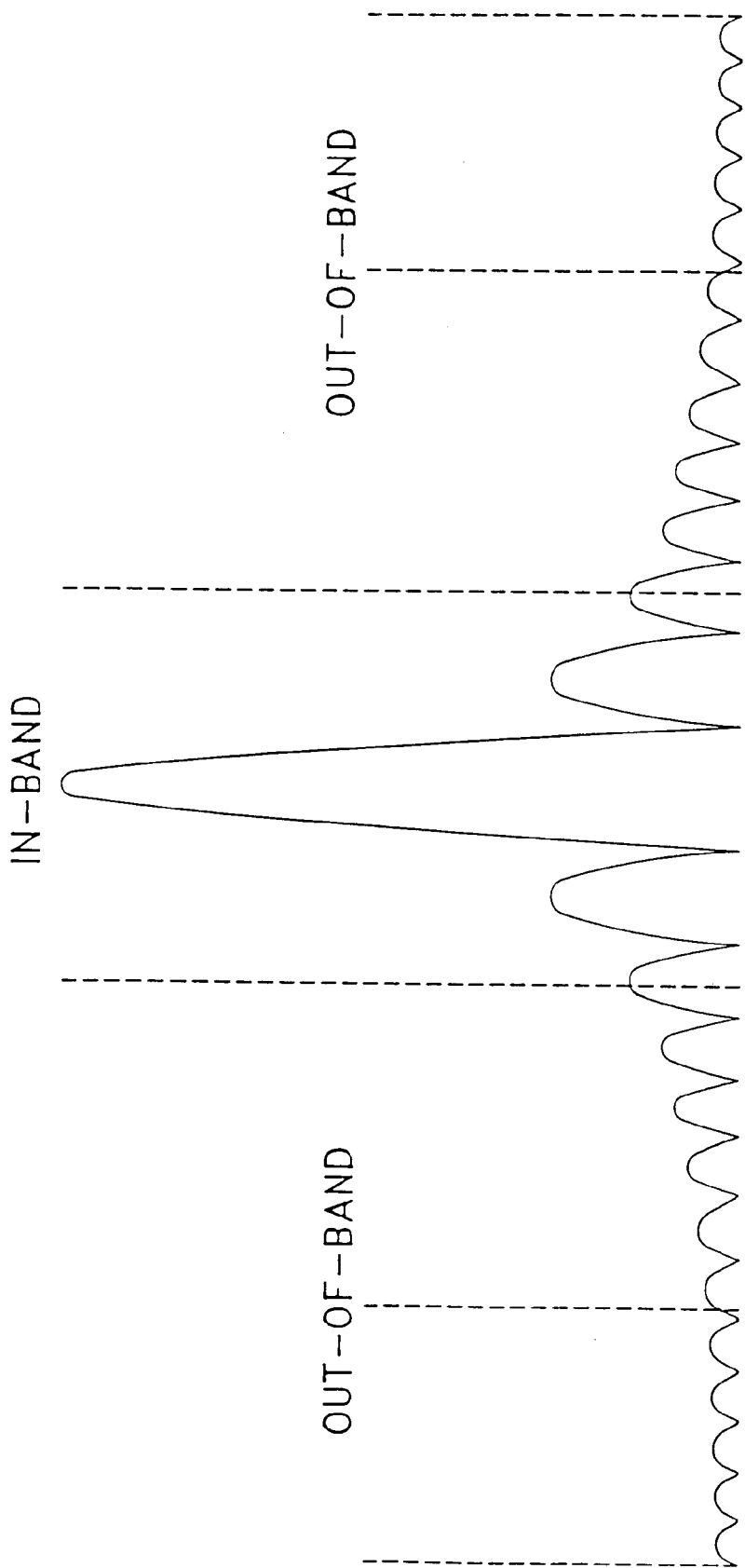
FIG. 3 is a graph depicting division into local subbands and leakage.

Assuming that there are NB components present in a kth subband, columns of X are decomposed into an in-band component:

$$Z_k^i = V_k^H X \quad (6)$$

and an out-of-band component:

$$Z_k^{ij} = V_k^{+H} X = [V_1 | V_2 | \ldots | V_{k-1} | V_{k+1} | \ldots | V_h]^H X \quad (7)$$

as illustrated in FIG. 3. The kth matrix filter $V_k$ is a passband filter designed for the band $[f_k - W, f_k + W]$. If desired, a more sophisticated filter design can be used, as is known in the art. The filters $V_k$ do not have to be orthogonal and can be overlapping.

The Principal Component Inverse (PCI) method of reduced-rank interference nulling is then used to estimate the NB component in the kth subband by solving:

$$\min_{S_k} \text{subj. to } \text{rank}[S_k] = r^{\|Z_k - S_k\|^2} F \quad (8)$$

A solution can be obtained from the Singular Value Decomposition (SVD) of $Z_k$ and is given by:

$$\hat{S}_k = \sum_{k=1}^{T} \hat{\sigma}_k \hat{u}_k \hat{v}_k^H \quad (9)$$

where the $\hat{u}_k$ and $\hat{v}_k$ are the r principal left and right singular vectors, respectively, of $Z_k$, and the $\hat{\sigma}_k$ are the r respective principal singular values. If r tonals are present in the kth subband, then the rank of $V_k^H X$ will also be r, and the matrix corresponding to the tonals can be estimated by finding the best rank r approximation filtered data matrix. Non-tonal NB components can also be effectively modeled as low rank (see L. L. Scharf et al., "Rank Reduction For Modeling Stationary Signals", IEEE Trans. on Acoustics, Speech, and Signal Proc., Vol. ASSP. 35, No. 3, pp. 350–354, 1987).

Inasmuch as it is not possible to design perfect passband filters $V_k$, NB components in the kth subband leak into the adjacent subbands (FIG. 3). This is not desirable. However, one can estimate or extrapolate the NB out-of-band leakage from the in-band NB estimate $S_k$ and then remove it.

Denoting the BB component in X as N, and the NB component as S, the in-band and out-of-band components can be written as:

$$Z_k^H = X^H V_k = \underset{NB}{S_k^H V_k} + \underset{BB}{N^H V_k} \quad (10)$$

and:

$$Z_k^{\dagger H} \cdot = X^H V_k^{\dagger} = \underset{NB}{S_k^H V_k^{\dagger}} + \underset{BB}{N^H V_k^{\dagger}} \quad (11)$$

respectively. The formula immediately above (11) is rewritten as:

$$Z_k^{tH} = B^H Q + N^H V_k^t \quad (12)$$

where B is an r×2(N−L+1) matrix whose rows span the row space of S, and Q is an r×K (K is the number of columns of concatenated matrix filter bank V) matrix such that $S^H V_k^t = B^H Q$. It is then necessary to estimate the leakage $V_k^{tH} S$, which might appear impossible since it requires knowledge of S, which is not known. However, estimating the NB components, above, has provided an estimate of the row space of $S_k$ from the SVD of $Z_k$ as shown in equation 9, $B = [\hat{u}_1] \ldots [\hat{u}_r]$. Therefore, to estimate $S^H V_k^t$, one substitutes the estimate of B in place of B in (12), and solves for Q by least squares fitting to $Z_k^{tH}$ using equation 12. The final estimate of the out-of-band leakage is given by:

$$Z_k^t = Z_k^{tj} B^H (BB^H)^{-1} B \quad (13)$$

where j is the iteration number.

The in-band NB component $$Z_k^{j+1} = Z_k^j - S_k, \text{ is removed,} \quad (14)$$

and the out-of-band NB component $$Z_k^{t(j+1)} = Z_k^{tj} - Z_k^t, \text{ is removed} \quad (15)$$

and the counter is incremented j=j+1.

The above-described steps of subband decomposition, estimation of NB components, and estimation of out-of-band leakage and removal of NB components is repeated until NB components from all subbands are removed.

The BB time series is obtained from the cleaned Z, denoted as $Z_{clean}$, by first reconstructing the BB time series:

$$X_{BB} = (V^H) \# Z_{clean} \quad (16)$$

present in the columns of X, using the pseudo-inverse of $V^H$ and then arithmetically averaging all elements in $X_{BB}$ which correspond to the same time series sample using the method developed in D. Tufts et al., supra, for reduced-rank signal enhancement, which is denoted by the operation:

$$X_{BB} = \text{Average } [X_{BB}] \quad (17)$$

The NB time series estimate is then:

$$X_{NB} = X - X_{BB} \quad (18)$$

Weighted averaging proposed in A. A. Shah et al., "Estimation of the Signal Component of a Data Vector", Proc. of ICASSP 92, 1992, can be used to obtain even better performance.

EXAMPLE

Figure 4B:
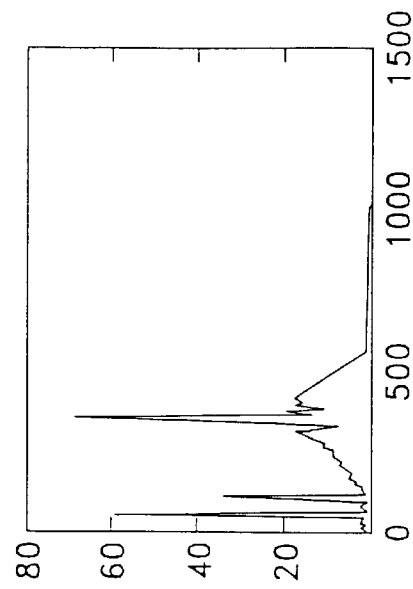
FIG. 4B is a graph depicting interference and signal spectrum.
Figure 4D:
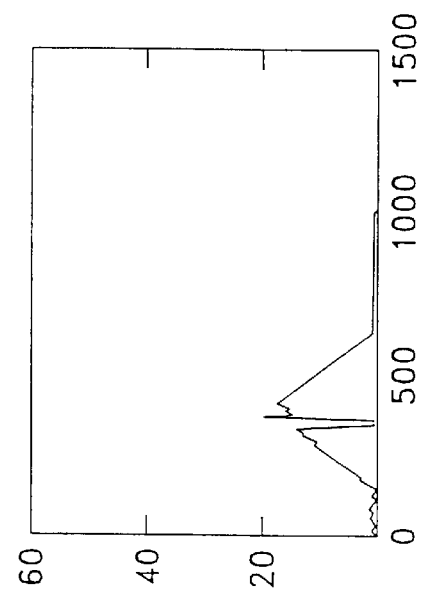
FIG. 4D is a graph depicting a residual spectrum as obtained in accordance with the invention herein.
Figure 4A:
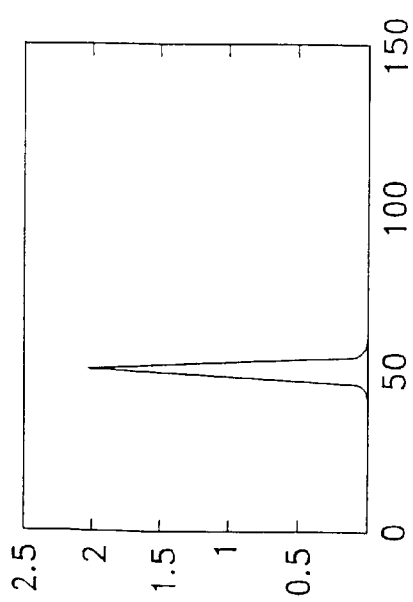
FIG. 4A is a graph depicting a signal envelope.
Figure 4C:
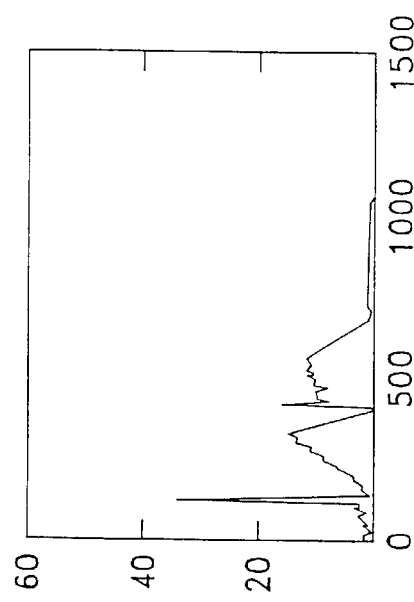
FIG. 4C is a graph depicting a Principal Component Inverse residual spectrum.

A computer generated, FIG. 4A, a BB transient-like signal 130 samples long that had a triangular shaped spectrum, and then added three interfering complex tones. The signal plus interference spectrum is plotted in FIG. 4B. The new procedure described above to remove the three interfering tones from the BB transient was applied. Briefly, the Nyquist band was divided up into ten non-overlapping subbands using matrix filters based on DPSS's sequences, as described earlier. The spectrum of the estimated BB component for the new method is plotted in FIG. 4D and the PCI method is plotted in FIG. 4C. The new procedure removed the tonals with little distortion to the BB transient, while for comparison, the PCI method applied directly to the time series caused considerable distortion to the transient by locking onto the transient spectral peak and missed one of the tonals.

Figure 5:
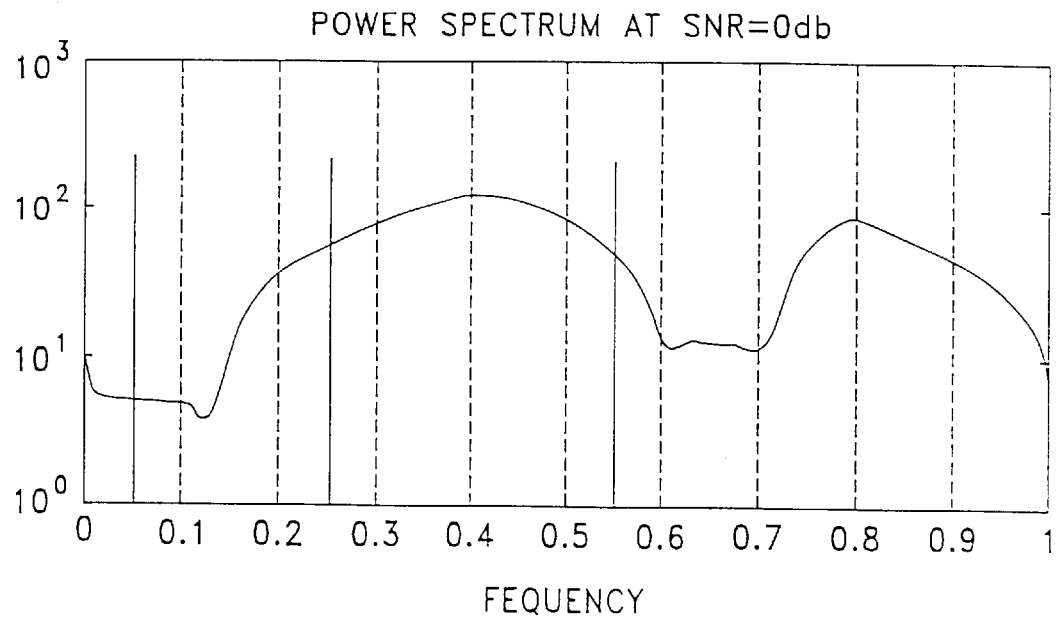
FIG. 5 is a graph depicting a power spectrum of simulated interference and signal division into subbands.

Next, a comparison was made of the new method against the Wiener filter method (assuming full knowledge of the NB and BB covariance) and the PCI method for estimating three complex tones scaled by complex Gaussian random variables embedded in colored Gaussian BB noise. The power spectrum of the three tonal signals and broadband noise for Signal to Noise Ratio (hereinafter designated as SNR) 0 db, is measured relative to the power of the three tones and BB component and division into subbands are plotted in FIG. 5. One hundred independent simulation trials were performed using computer generated 130 sample segments of signal-plus-noise to measure the mean-square estimation error (MSE) of the signal estimate for the new method and PCI method, assuming rank 3. The Wiener MSE was calculated theoretically. The MSE normalized by the total signal power is plotted for all three methods in FIG. 6 as a function of SNR (the BB noise component power was varied while the signal power was kept fixed).

Figure 6:
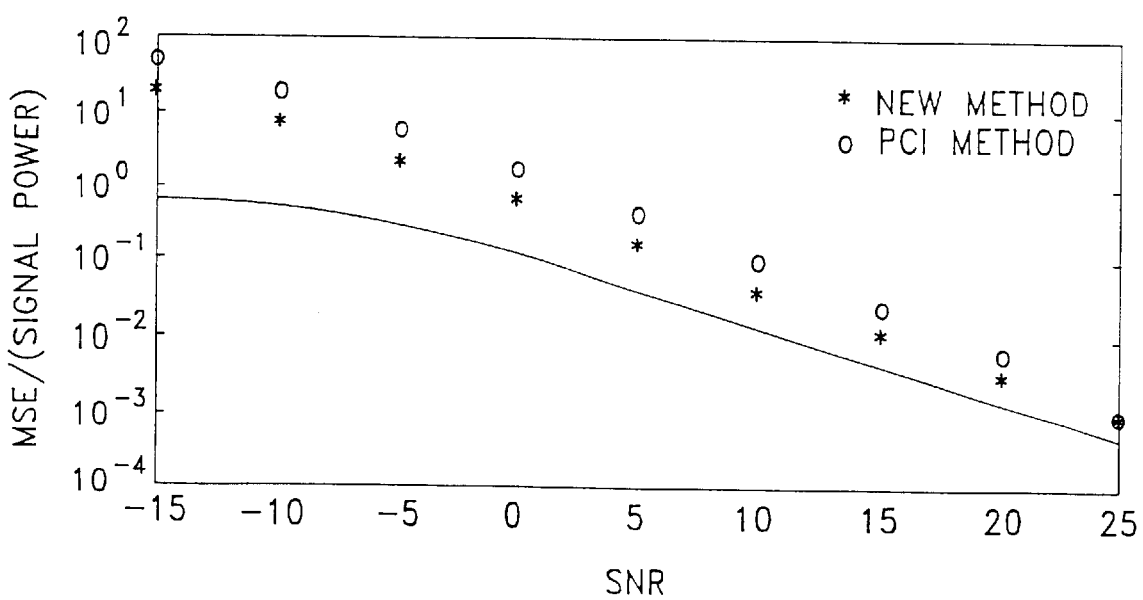
FIG. 6 is a graph in which normalized mean-square estimation error of the Principal Component Inverse method is compared with the method described herein.

At high SNR, the new method and the PCI method both performed well, being close to the Wiener MSE (see FIG. 6). However, at moderate to low values of SNR starting around 15 db and lower, the new method significantly outperformed the PCI method, while the MSE is still close to the Wiener filter.

This is because the PCI method began to mistake the local spectral peaks of the BB component for the NB components, while the new method using local subband processing avoided this problem.

From practice of the above-described method, there is desired a new, robust procedure for automatically separating time series data into its constituent narrowband and broadband time series components. The new procedure avoids the pitfalls of adaptive notch filters, PCI method, or other similar algorithms, of mistaking and filtering local spectral peaks of the broadband component as narrowband components by decomposing the data vector into local subbands by a bank of matrix filters. In piecewise fashion, the narrowband components are estimated and then filtered from each subband using the PCI method. Finally, the filtered components are coherently recombined to obtain the narrowband and broadband time series estimates. Computer simulation results have shown that the new procedure works well and can have performance close to the clairvoyant Wiener filter.

There is thus provided a method for detecting a contact in an ocean environment and, more generally, a method for separation of acoustic data into a narrowband and broadband time series component, indicative of the contact, and a broadband time series component resulting from randomly generated sounds, i.e., background noise.

It will be understood that various changes in the details, and method steps, and arrangement of steps, which have been herein described and illustrated in order to explain the nature of the invention, may be made by those skilled in the art within the principle and scope of the invention as expressed in the appended claims.

What is claimed is:

1. A method for separation of acoustical data into narrowband and broadband time series components, the method comprising the steps of:
  constructing a data matrix in which time series samples of acoustical data are arranged in a forward-backward linear predictor matrix;
  decomposing a subband of the matrix into an in-band component and an out-of-band component;
  estimating narrowband components;
  estimating out-of-band leakage;
  removing the in-band narrowband component and the out-of-band narrowband component;
  repeating all the five enumerated above sequentially steps until narrowband components from all of the subbands of the matrix are removed from the acoustical data; and
  reconstructing the broadband time series;
  whereby to provide a narrowband time series estimate indicative of the presence of a signal in the acoustical data.

2. The method in accordance with claim 1 wherein the forward-backward linear predictor matrix comprises:

$$X = \begin{bmatrix} x_1 & \cdots & x_{N-L+1} & \overline{x}_L & \cdots & \overline{x}_N \\ x_2 & \cdots & x_{N-L+2} & \overline{x}_{L-1} & \cdots & \overline{x}_{N-1} \\ \vdots & \cdots & \vdots & \vdots & \vdots & \vdots \\ x_L & \cdots & x_N & \overline{x}_1 & \cdots & \overline{x}_{N-L+1} \end{bmatrix}$$

3. The method in accordance with claim 2 wherein in decomposing a substrate of the matrix, columns of X are decomposed into the in-band component $Z^J_k = V_k^H X$ and into the out-of-band component $Z^{ij}_k = V^{iH}_k X = [V_1 | V_2 | \cdots | V_{k-1} | V_{k+1} | \cdots | V_n]^H X$.

4. The method in accordance with claim 3 wherein estimating narrowband components comprise estimating such components in a selected subband by solving:

$$s_k \, \underset{subj.\,to}{\min} \, rank[s_k] = r^{\|Z_k - S_k\|^2} F$$

and obtaining a solution from an SVD of $Z_k$ in accordance with $$\hat{S}_k = \sum_{k=1}^{T} \hat{\sigma}_k \hat{u}_k \hat{v}_k^H$$

where the $\hat{u}_k$ and $\hat{v}_k$ are the r principal left and right singular vectors, respectively, of $Z_k$, and the $\hat{\sigma}_k$ are the r respective principal singular values.

5. The method in accordance with claim 4 wherein estimating the out-of-band leakage comprises denoting the broadband component in X as N, and the narrowband component as S in the formulas:

$$Z_k^H = X^H V_k = \underset{NB}{S_k^H V_k} + \underset{BB}{N^H V_k}$$

and:

$$Z_k^{\dagger H} = X^H V_k^\dagger = \underset{NB}{S_k^H V_k^\dagger} + \underset{BB}{N^H V_k^\dagger}$$

respectively.

6. The method in accordance with claim 5 wherein the last-mentioned formula is rewritten as:

$$Z_k^{iH} = B^H Q + N^H V_k^i$$

where B is an rx2(N−L+1) matrix whose rows span the row space of S, and Q is an rX K matrix, such that $S^H V_k^i = B^H Q$, and the final estimate of the out-of-band leakage is $$Z_k^i = Z_k^{ij} B^H (BB^H)^{-1} B$$

where j is an iteration number, the narrowband component $$Z_k^{j+1} = Z_k^j - S_k,\text{ is removed, and}$$

the out-of-band component $Z_k^{j(j+1)} = Z_k^{tj} - Z_k^t$, is removed, and the counter is incremented j=j+1.

7. The method in accordance with claim 6 wherein during reconstructing the broadband time series, such series is obtained from a cleaned Z, denoted as $Z_{clean}$, by $$X_{BB} = (V^H)\# Z_{clean}$$

present in the columns of X, using a pseudo-inverse of $V^H$ and arithmetically averaging all elements in $X_{BB}$ which correspond to the same time series sample, denoted by the operation:

$$X_{BB} = \text{Average}[X_{BB}]$$

providing for computation of the narrowband time series estimate by use of:

$$X_{NB} = X - X_{BB}.$$

8. A method for detecting a target in an ocean environment, the method comprising the steps of:
   providing acoustical data by operation of a sonar system, the acoustical data including narrowband components indicative of presence of the contact and broadband components resulting from randomly generated sounds;

constructing a data matrix in which time series samples of acoustical data are arranged in a forward-backward linear predictor matrix;

decomposing a subband of the matrix into an in-band component and an out-of-band component;

estimating narrowband components;

estimating out-of-band leakage;

removing the in-band narrowband component and the out-of-band narrowband component;

repeating sequentially the above enumerated steps of constructing a data matrix, decomposing a subband of the matrix and estimating out-of-band leakage steps until narrowband components from all of the subbands of the matrix are removed from the acoustical data; and reconstructing the broadband time series;

whereby to provide a narrowband time series estimate indicative of the presence of the contact in the ocean environment.

* * * * *